United States Patent [19]
Bell, Jr. et al.

[11] 3,795,000
[45] Feb. 26, 1974

[54] OPTICAL INTERFERENCE DIRECTIONAL SENSING
[75] Inventors: De Lamar T. Bell, Jr.; Robert E. Lee, both of Dallas, Tex.
[73] Assignee: Texas Instruments Incorporated, Dallas, Tex.
[22] Filed: Dec. 23, 1966
[21] Appl. No.: 605,530

[52] U.S. Cl. ............... 343/113, 340/16 R, 350/161
[51] Int. Cl. ............................................. G01s 3/46
[58] Field of Search ........ 343/113; 350/161; 340/16

[56] References Cited
UNITED STATES PATENTS
| 3,171,126 | 2/1965 | Wiley | 343/112 |
| 3,297,876 | 1/1967 | Maria | 350/161 X |
| 3,329,954 | 7/1967 | Travers | 343/119 X |

Primary Examiner—Maynard R. Wilbur
Assistant Examiner—Richard E. Berger

[57] ABSTRACT

Disclosed herein is a method and apparatus for determining the frequencies and angles $\phi$ between a reference direction and radial lines directed from a monitoring station toward radiating field sources of unknown locations by generating an omni signal, a sin $\phi$ and cos $\phi$ signal, and a sin $2\phi$ and cos $2\phi$ signal to produce three parallel sound waves traveling through a body whose index of refraction is varied in dependence upon the signal from said sources so as to produce an interference pattern in light issuing from said body. The interference pattern is displayed on a two-dimensional basis in which one dimension represents the frequency of a given source and the other dimension represents the angle $\phi$ between a reference direction and a line extending from the monitoring station to the source.

13 Claims, 9 Drawing Figures

PATENTED FEB 26 1974 3,795,000

INVENTORS:
**DeLAMAR T. BELL, JR.
ROBERT E. LEE**

ATTORNEY

INVENTOR
DeLAMAR T. BELL, JR.
ROBERT E. LEE

ATTORNEY

INVENTORS:
DeLAMAR T. BELL, JR.
ROBERT E. LEE

ATTORNEY

OPTICAL INTERFERENCE DIRECTIONAL SENSING

This invention relates to the determination of the direction of arrival of radiation detected at a listening station and more particularly to direction finding by use of optical interference.

Passive listening stations are employed to detect and indicate the direction from a listening station to one or more sound sources or from one or more radio stations or similar sources of radiation. The present invention is concerned with processing of signals received at a listening station. The problem overcome by the invention is to provide a visual display indicating simultaneously both the direction to and frequency of all sources within the range and frequency band of the listening station.

In monitoring sources of electromagnetic radiation, antenna arrays have heretofore been developed which are suitable for production of at least some of the signals utilized in accordance with the present invention. In an Interim Development Report for Direction Finder Radio, Shipboard Citing and Design Study and Development, U. S. Department of Commerce Research Report No. AD 602,118 by W. M. Sherrill and Douglas N. Travers, May 31, 1964, antennae are disclosed which produce signals proportional to $\sin \phi$, $\cos \phi$, $\sin 2\phi$, and $\cos 2\phi$. The present invention is concerned with improvement in utilization of such signals for identifying signals from different stations and for producing a visual indication of the information contained in such signals.

More particularly, in accordance with the invention, a system is provided for determining the angle $\phi$ between a reference direction and a radial line directed from a listening station toward a radiating field source of unknown location. Light interference means are provided for effectively forming a dynamic diffraction grating. Sensor channels terminate in three acoustic transducers coupled to the light interference means for producing three side-by-side physical representations of the signals from said sensors. The center beam is representative of a source of unknown location multiplied by $\sin \phi$ and $\cos \phi$ where $\phi$ is the angle between a selected reference direction and the direction to the unknown source. One side beam is representative of the signal. The other side beam is representative of the signal multiplied by $\sin 2\phi$ and $\cos 2\phi$. Means are then provided for displaying the interference patterns in the coherent light passing through said representations.

For a more complete understanding of the present invention and for further objects and advantages thereof, reference may now be had to the following description taken in conjunction with the accompanying drawings in which.

Figure 1:
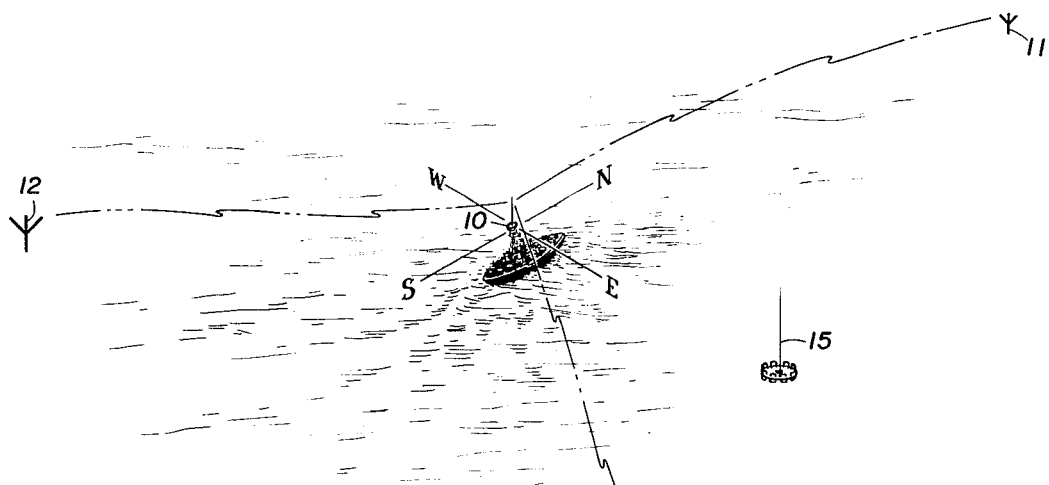
FIG. 1 is a panoramic illustration of the setting for the present invention.

A typical setting for the present invention is illustrated in FIG. 1 where an antenna array 10 is located at a listening station such as on a ship at sea which is assigned a monitor task. The object is to identify radio stations, such as stations 11–13, located below the horizon in unknown directions. A second listening station 15, in cooperation with station 10, would provide information such that, by triangulation, the range of the stations 11–13 could be determined. Operation of either of stations 10 or 15, in accordance with the present invention, provides for a two-dimensional display of energy from one or more stations in range of the listening station with the frequency of the signal from each station and direction to such station being indicated.

Figure 2:
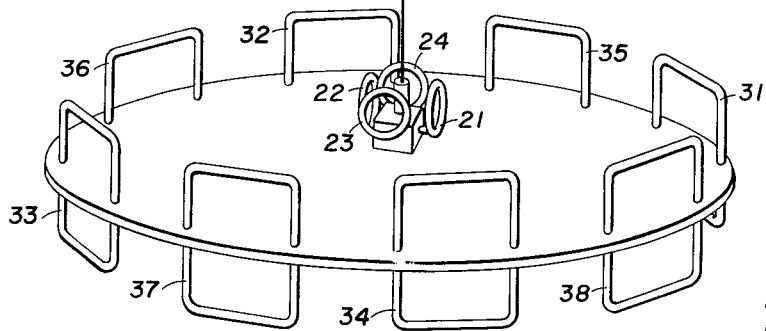
FIG. 2 is an illustration of a suitable antenna array for generation of the signals employed in accordance with the present invention.

In FIG. 2, an antenna array suitable for use in accordance with the invention is shown. Portions of such an array, its construction and functions are well known. A detailed description of the loop antennae included in FIG. 2 appears in the above noted U. S. Department of Commerce Research Report No. AD 602,118.

Briefly, the array 10 includes an omni-antenna 20 which provides an output signal representative of the electric component of sum of signals from all sources that are within range. Two simple loop antennae 21 and 22 provide a signal proportional to the magnetic component of a signal from any source multiplied by $\sin \phi$ where $\phi$ is the angle between the axis of loops 21 and 22 and a line leading from the station 10 directed toward the source, as for example, toward source 11. Two simple loops 23 and 24 provide a similar signal multiplied by $\cos \phi$.

Eight spaced loops 31–38 provide two output signals multiplied by $\sin 2\phi$ and $\cos 2\phi$ respectively.

Figure 3:
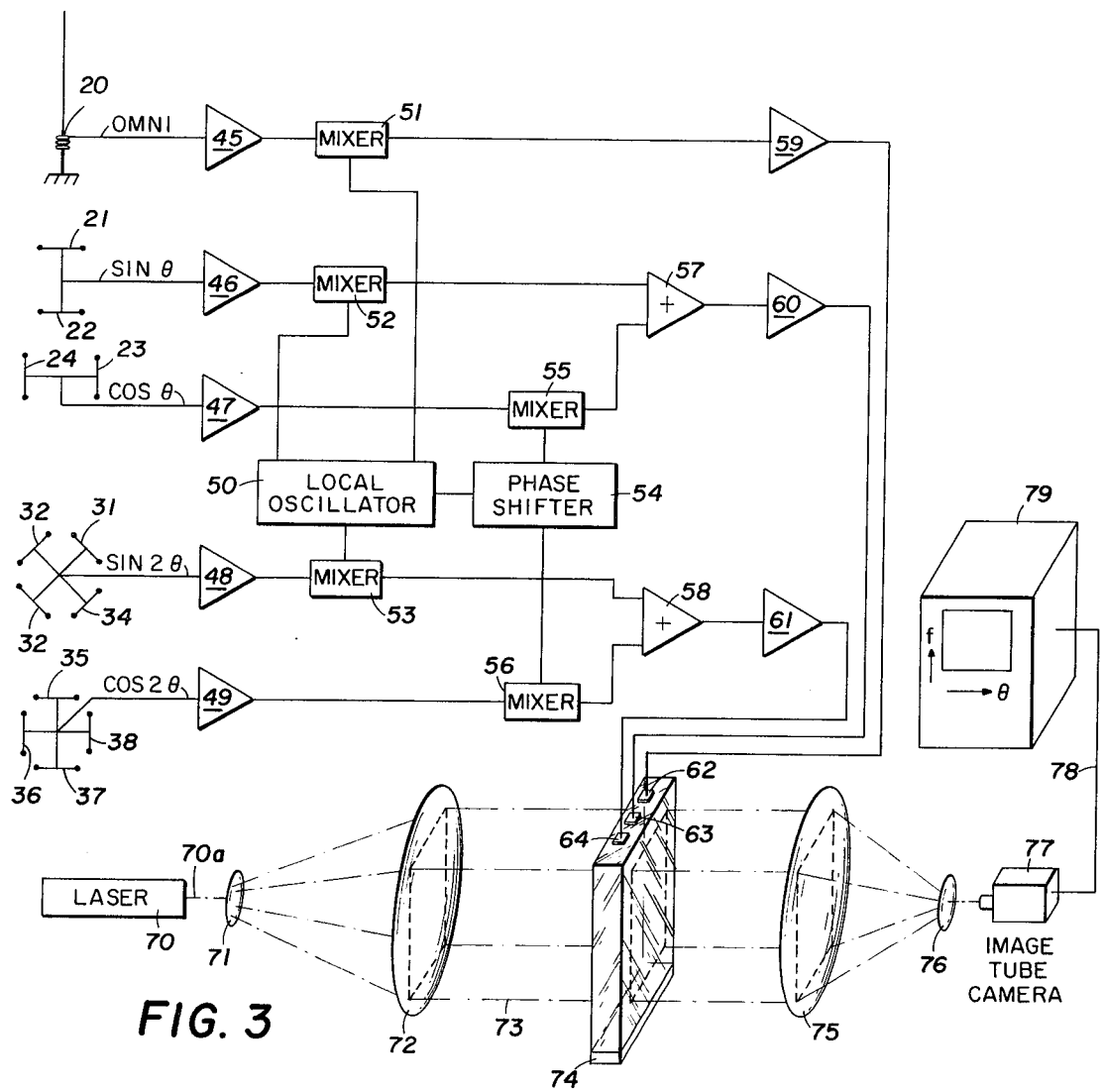
FIG. 3 is a diagram illustrating one embodiment of the present invention.

The five signals thus produced are employed in the system of FIG. 3 to produce a new and useful information display.

In FIG. 3, one embodiment of the present invention has been shown. The omni-antenna 20 is connected by way of an amplifier 45, a mixer 51 and a power amplifier 59 to an acoustic driver element 62. Similarly, the $\sin \phi$ loops 21 and 22 are connected by way of amplifier 46 and mixer 52 to a summing unit 57. Cos $\phi$ loops 23 and 24 are connected by way of amplifier 47 through a mixer 55 to the second input of the summing amplifier 57. An output amplifier 60 then connects the output of amplifier 57 to a second acoustic driver 63. The loops 31–35 are connected by way of amplifier 48 and mixer 53 to one input of a summing amplifier 58. Loops 35–38 are connected by way of amplifier 49 to a mixer 56 whose output is connected to the second input of summing amplifier 58. The output of amplifier 58 is connected by way of amplifier 61 to a third acoustic driver 64.

A local oscillator 50 is connected to apply the output thereof to the mixers 51, 52 and 53. The output of the oscillator 50 is also applied to a phase shifter 54 whose output is applied both to the mixer 55 and to the mixer 56. The phase shifter 54 serves to shift by 90° the phase of the signal mixed with the $\cos \phi$ signal and with the cos $2\phi$ signal before the latter signals are applied to the summing amplifiers 57 and 58.

The acoustic drivers 62-64 are associated with a body 74 having a variable index of refraction. The index of refraction is varied in accordance with the present invention in dependence upon the summation signals applied to the drivers 62-64 to vary the index of refraction in dependence upon an acoustic wave traveling therethrough.

The variations in the index of refraction of the body 74 produce a unique output signal. For this purpose, a laser light source 70 is employed which has an output beam 70a which passes through a spreading lens 71 and a collimating lens 72. The resultant collimated beam 73 passes through the body 74 and thence to a condensing lens 75 and a viewing lens 76 to an image tube camera 77. Output signals from the camera 77 are applied by way of channel 78 to a display device 79 such as a cathode ray oscilloscope.

In operation, the omni-antenna 20 produces an output signal which is representative, in phase and amplitude, of the sum of all of the radiation fields within its range. The omni-antenna 20 is responsive to the electric field. The antenna 21-22 and 23-24 produce output signals which are representative of sin $\phi$ and cos $\phi$, respectively. Antenna 31-34 and 35-38 produce output signals representative of sin $2\phi$ and cos $2\phi$, respectively. Antenna 21-38 are responsive to the magnetic field and thus the signals therefrom are phased 90° from the omni signal. The omni signal from amplifier 45 is mixed, in mixer 51, with the local oscillator signal from oscillator 50. The sum of the two signals is then applied by way of power amplifier 59 to the electric acoustic transducer 62.

The sin $\phi$ signal from amplifier 46 is mixed with the local oscillator signal in the mixer 52 with the sum being applied to the adding unit 57.

The cos $\phi$ signal from amplifier 47 is applied to mixer 55 where it is mixed with a signal derived from oscillator 50 but shifted in phase by 90° by the phase shifter 54. The output of the mixer 55 is applied to the summing unit 57.

The sin $\phi$ and cos $\phi$ sums are then applied by way of power amplifier 50 to the second electro-acoustic transducer 63.

In a similar manner, the third electro-acoustic transducer 64 is excited by the sum output signal from adder 58 as amplified by power amplifier 51. One input to summing unit 58 is supplied by the mixer 53 having one input fed by amplifier 48 and the other input fed by oscillator 50. The other input to summing unit 58 is supplied from mixer 56 which has one input fed by amplifier 49 and the other input by the phase shifter 54.

Figure 4:
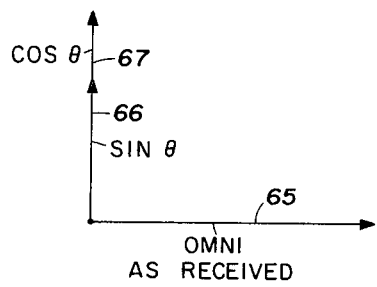
FIG. 4 illustrates the phase relationship between signals received by the array of FIG. 2.
Figure 5:
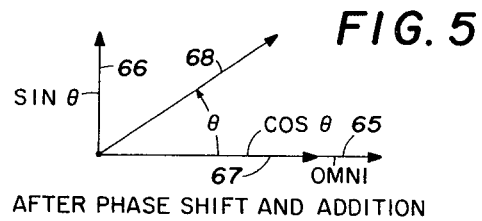
FIG. 5 illustrates the phase relationships of the signals adjusted in accordance with the present invention.

FIG. 4 illustrates the relationship between the omni signal represented by vector 65, the sin $\phi$ signal represented by vector 66, and the cos $\phi$ signal represented by vector 67. The operation of the phase shifter 54 is to shift the cos $\phi$ vector 67 as to be in phase with the omni vector 65. THe sin $\phi$ signals and the cos $\phi$ signals are added in the summing amplifier 57. The output of the summing amplifier is a signal represented by vector 68 which is constant in amplitude but varies in phase with respect to the omni signal in direct ratio as $\phi$ varies.

As above noted collimated coherent light from a laser 70 passes through the modulator 79. The display on unit 74 has, as one coordinate, the frequency (f) of any signal detected by the antenna system and, as the other coordinate, the angle $\phi$ which describes the relationship in azimuth between a reference line passing through the location of the listening station and a line extending from the station toward a radiating source.

By generating sound fields in the modulator 74, the index of refraction of the modulator body is altered locally in the three zones underlying the transducers 62-64. The transducers are spaced on modulator 74 such that the distance from transducer 62 to transducer 63 is one-half of the distance from transducer 62 to transducer 64. As a result of modulation with such geometry, separate portions of the collimated beam 73 are selectively diffracted in dependence upon the three acoustic fields. The interference patterns thus produced as viewed by the camera 47 will portray, in a two-dimensional display, the two functions (i) frequency and (ii) the angle $\phi$.

Figure 6:
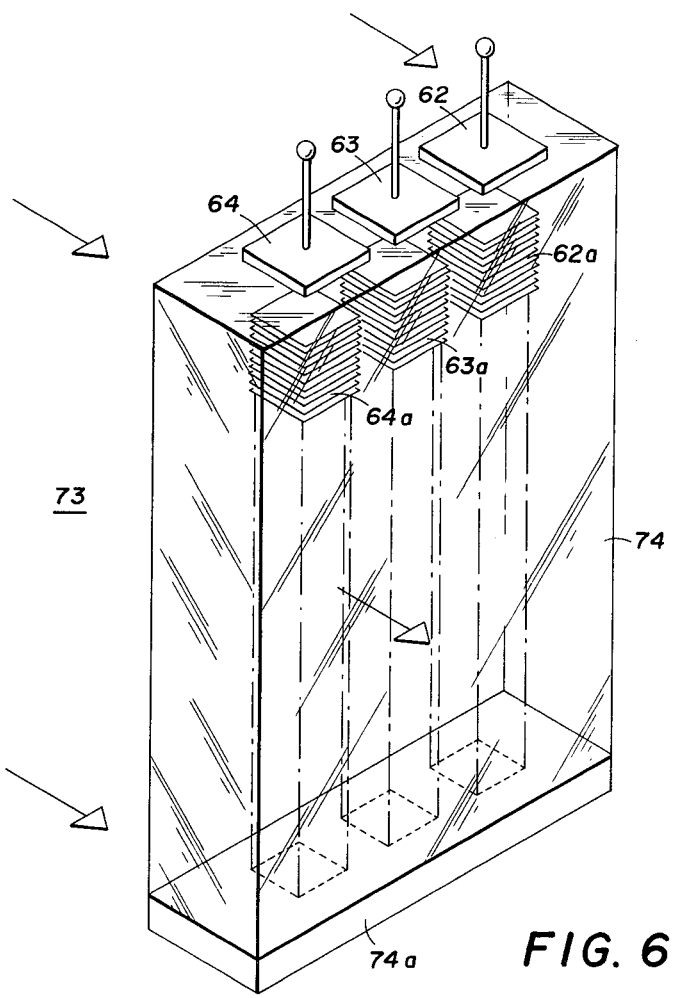
FIG. 6 illustrates a modulator employed in the present invention.

In FIG. 6, one embodiment of the modulator 74 has been shown wherein collimated light 73 enters the back of the unit and emerges from the face. The unit 74 may comprise a body of fused silica. Three quartz crystal transducers 62-64 are mounted on the top and a sound absorbent body 74a on the bottom. Three ultrasonic beams produced in the body 74 effectively form a diffraction grating. When an AC voltage is applied to transducer 62, for example, it will expand and contract the transducer sending an ultrasonic wave 62a into the light modulating body 74. Planes in the light modulating material through which the stress wave travels are compressed and expanded to produce either higher or lower indexes of refraction, respectively. A plane wave of monochromatic, coherent light propagating through this region travels at various speeds and thus emerges with a corrugated wave front. The nature of this diffraction process depends upon the wave length and hence the frequency of the ultrasonic wave. Higher frequencies cause light to be diffracted through a larger angle. Acoustic shear waves may also be used.

The three transducers 62-64 produce three fields 62a, 63a and 64a. The signal representing the omni-antenna output is applied to the transducer 62 to produce sound field 62a. The sin $\phi$ and cos $\phi$ signals are applied, after mixing in unit 57 of FIG. 3, to the transducer 63 to produce the sound field 63a. The sin $2\phi$ and cos $2\phi$ signals are applied to the transducer 64.

The distance between the centers of transducers 62 and 63 is one-half the distance between the centers of transducers 62 and 64. By reason of this relationship and the phase and amplitude relationships existing in the signals applied to the transducers, interference patterns will be produced in the light emanating from the body 74 as to provide a three-dimensional display in which frequency forms the ordinate and the direction of arrival is the abscissa.

Figure 7:
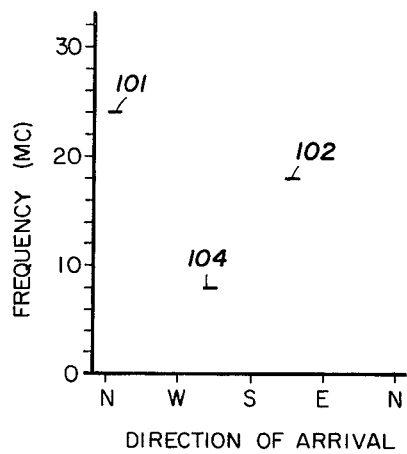
FIG. 7 illustrates a display produced in accordance with the invention.

In FIG. 7, the display such as would be produced on the unit 79 of FIG. 3 has been shown in somewhat enlarged form with signals from three stations being portrayed. The first signal represented by the line segment 101 represents the signal from station 11 of FIG. 1. The signal from station 11 is of higher frequency. Thus, light is diffracted through a larger angle by the sound field produced by that signal than from the other stations and thus is indicated on the frequency scale at 24 megacycles. Because of the phase relationships existing between the three signals applied to the transducers 62, 63 and 64, the interference pattern produces line segment 101 centered at the direction representative of the angle $\phi$.

Similarly, the line segment 102 represents a signal from station 13 located in the southeast quadrant of the field being monitored by the unit 10 of FIG. 1. At a lower frequency, the signal appears on the scale at 18 megacycles. The interference pattern indicates a direction from the listening station to the station 13 at an angle $\phi$ indicative of a southeasterly location. Finally, the line segment 104 represents the still lower frequency signal from station 12. The interference pattern indicates that the direction from the listening station to the source 12 is about southwest.

A greater number of stations will be identified by the appearance on the display of FIG. 7 of additional lines. The direction to each of the sources of such signals would be indicated by the location of the resultant line segment. This display is made possible through the use of modulating the transmission properties of the body 74 by acoustic waves of uniquely related phase relationships.

Figure 8:
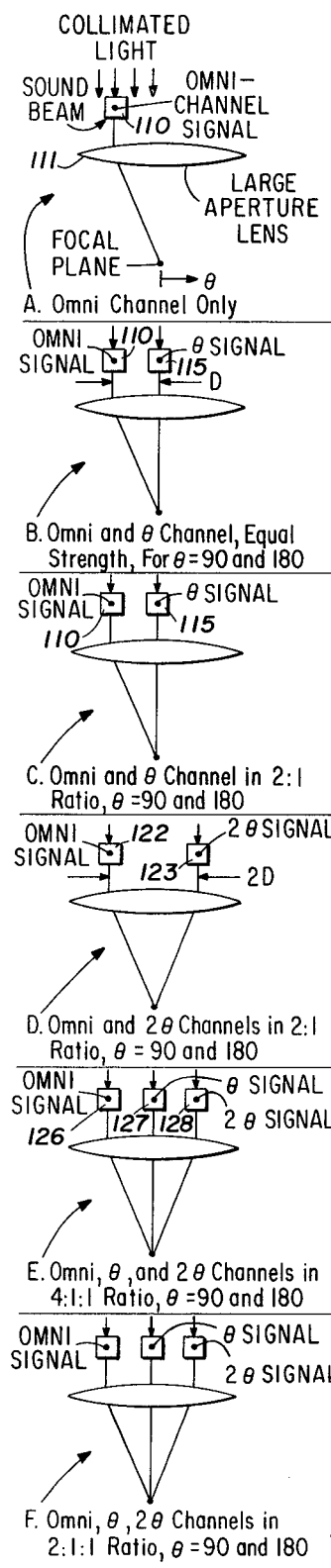
FIG. 8 illustrates operation of the system of FIG. 3.
Figure 8:
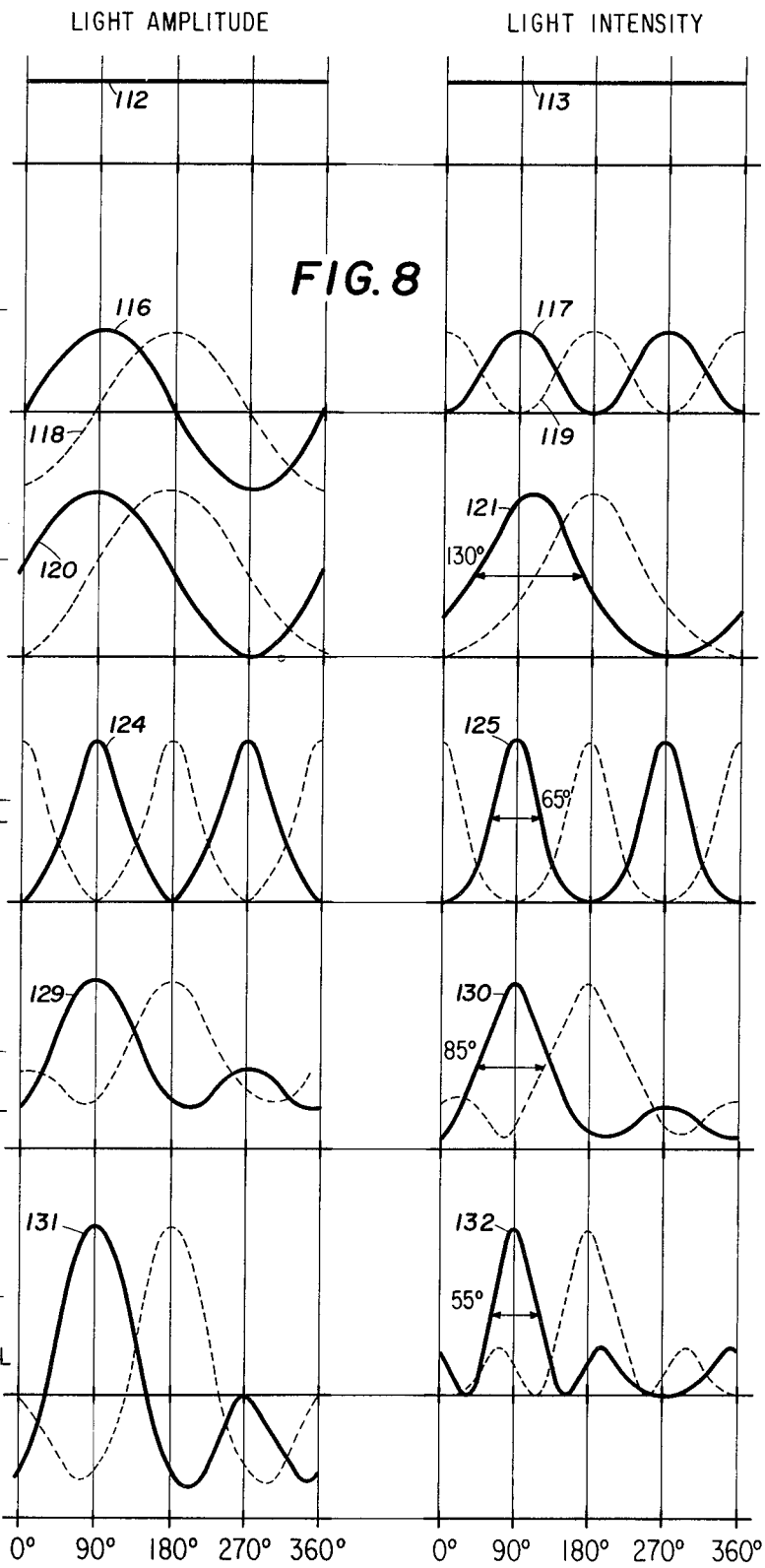

It will be helpful to consider FIG. 8 which illustrates the operation of the system. A qualitative understanding of the diffraction pattern which would result from combining the outputs from several beams may be obtained by examining FIG. 8.

The optical system is represented on the left of FIG. 8 by collimated input light incident on square sound beams traveling into the paper. The light is diffracted by the sound beams and focused to a common focal plane by the lens 111. The diffraction pattern in the direction perpendicular to the optic axis of the material in which the sound beam travels is shown greatly magnified in the sketches to the right. With the geometry shown in FIG. 2, a full 360° coverage is provided with the distance equal to two full fringes from an aperture of 0.25 inches wide. This distance is 200 microns for a 40-inch focal length optical system and 6328 angstrom units light. The resolution in the frequency direction is 3.2 microns.

In FIG. 8, both amplitude and intensity (amplitude squared) are illustrated. When the omni channel signal is employed to produce sound field 110, lines 112 and 113, representing light amplitude and light intensity, respectively, are unchanged over the entire length indicating no interference pattern produced by travel of the collimated light through the area affected by sound beam 110.

When two channels are employed as by utilizing sound channel 110 and sound channel 115, a pattern in both light amplitude and light intensity is produced, as indicated by the curves 116 and 117. If one channel differs in phase from the other, then the pattern is also shifted as shown by curves 118 and 119. If the omni channel signal is stronger than the $\phi$ channel (the combination of the sin $\phi$ and the cos $\phi$ signals) in a ratio of 2:1 or greater, the light amplitude never goes negative in the region of interest and the intensity pattern gives a unique answer as to the direction of a given source. In the production of curves 120 and 121 for instance, the same sources 110 and 115 are employed as were employed for producing curves 116 and 117. However, in this case, the strength of the omni and $\phi$ channel are in the ratio 2 to 1 with the phase angles being 90° and 180°, respectively. When such is the case, there is no negative light amplitude and the stronger peak 121 obtained.

Curves 124 and 125 represent the effect of combining the omni signal 122 and the 2$\phi$ signal 123. If the omni signal strength is twice the 2$\phi$ signal strength and if the distance is doubled between the channels in the system as represented by the channels 122 and 123, then the pattern shown by curves 124 and 125 is produced.

An enhanced pattern is obtained by using all three sound beams namely, the omni signal beam 126, the $\phi$ signal beam 127, and the 2$\phi$ beam 128. The responses to this configuration are shown by curves 129 and 130 for a signal strength ratio of 4:1:1 and by curves 131 and 132 for a signal strength ratio of 2:1:1 where the omni signal is the strongest in each case. The combined response is sharper and not as badly disturbed by reradiation as in a single-channel response.

The angular resolution may be traded with some increase in the side lobe level, by modifying the omni signal amplitude. More particularly, if the $\phi$ and 2$\phi$ responses are added to an omni signal in a ratio of 2:1:1 for omni, $\phi$ and 2$\phi$ respectively, curves 131 and 132 result in which the half power width has been reduced from approximately 130° on curve 121 to 65° on curve 125, 85° on curve 130 and 55° on curve 132.

Additional channels may be added by placing more sound beams at the delay line. Expansion to include 3$\phi$ and 4$\phi$ channels would be helpful in order to achieve increased resolution. Thus, it will now be understood that this process produces a panoramic direction finding display without scanning, thus giving the highest possible probability of interception of all stations within range.

Further, it will now be appreciated that different types of antenna arrays may be beneficially employed for establishment of sound fields in a body having a variable index of refraction so that an interference pattern will be produced in coherent light issuing from such body which is uniquely indicative of a characteristic of a source of energy detected by such antenna array, either as to frequency or as to location or both.

Furthermore, it may be found to be helpful to produce more than one sound beam in the light transmitting body for each signal.

In accordance with the present invention and in order to provide an indication of the location of an radio frequency (R.F.) source relative to a monitoring station, an omni signal, a sin $\phi$ and cos $\phi$ signal, a sin 2$\phi$ and cos 2$\phi$ preferably are employed to produce three parallel sound waves traveling through a body whose index of refraction is varied locally in dependence upon such sound waves as to produce a unique interference pattern in light issuing from such body. Preferably, the interference pattern will be displayed on a two-dimensional basis where one dimension represents the frequency of a given signal and the other dimension represents the angle $\phi$ between a reference direction and a line extending from the monitoring station to the source. For increased resolution, the omni signal preferably is weighed by a factor of the order of two greater than the other signals employed for production of the sound waves. The pattern of the sound waves through the light transmitting body preferably are spaced apart by distances which bear a predetermined relation to the order of the trigonometric functions employed for notifying the various signals, i.e., the sin φ and cos φ sound field is spaced from the omni sound field one-half the spacing between the omni sound field and the sin 2φ and cos 2φ sound field.

The embodiment of the invention shown in FIGS. 1–8 is employed for monitoring sources of electromagnetic radiation. The sound fields in element 74 effectively forms a light interference means which operates as a dynamic diffraction grating. Light transmitted through the grating forms an interference pattern which simultaneously indicates the frequency of and bearing to one or more sources, signals from which are sensed by the antenna array.

Figure 9:
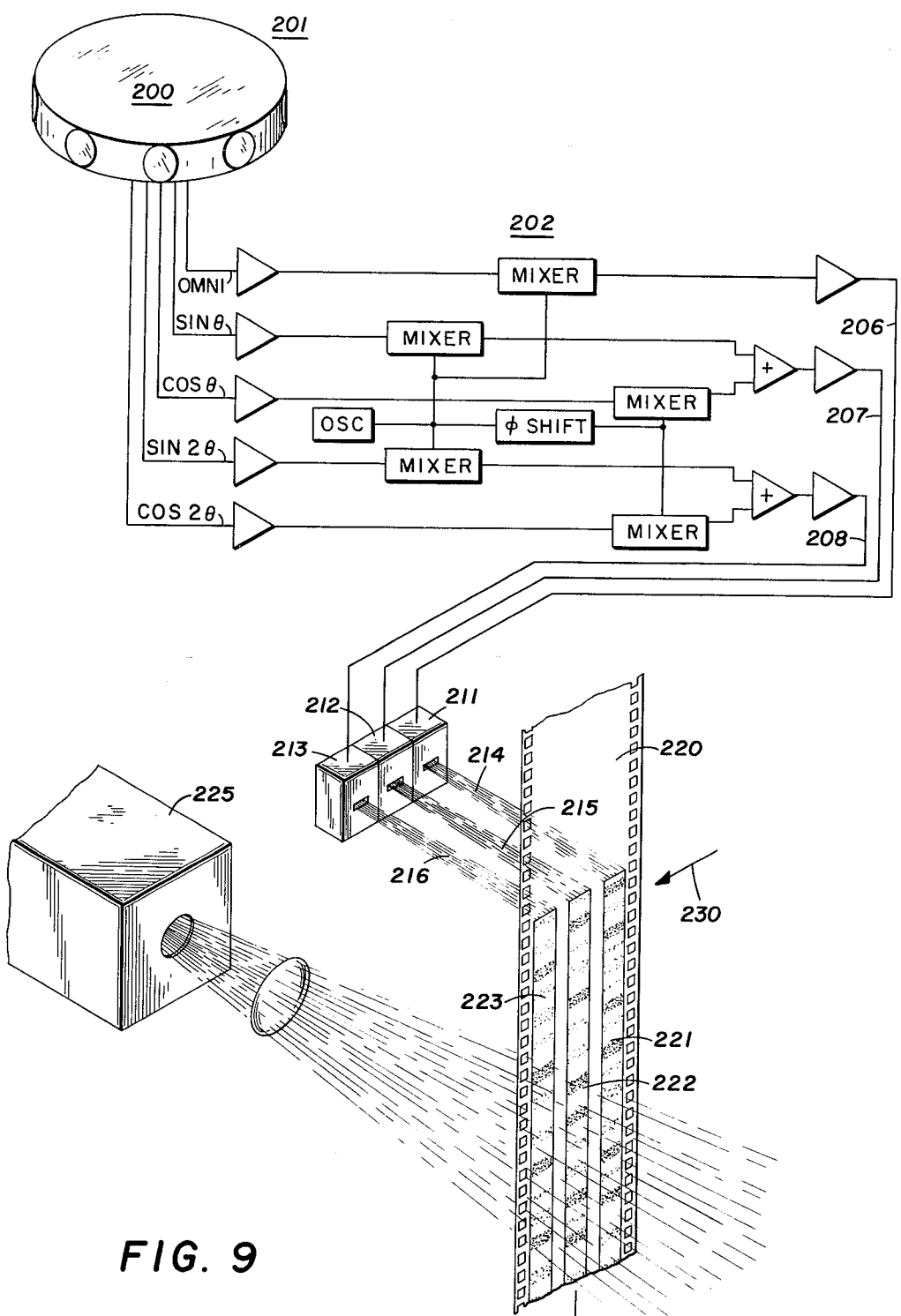
FIG. 9 illustrates an acoustic embodiment of the invention.

In contrast with the electromagnetic monitor system of FIGS. 1–8, the system of FIG. 9 operates at lower frequencies, such as involved in the audio range in sonar operations.

In FIG. 9 an array 200 of acoustic sensors are employed at an acoustic monitor station 201. Five output signals are produced which are (a) omni, (b) sin φ, (c) cos φ, (d) sin 2φ, and (e) cos 2φ.

The five signals are combined in the processing system 202 to provide the three output signals generally corresponding with those of FIGS. 1–8 except at audio frequencies.

In order to employ audio frequencies, it is necessary to employ a dynamic diffraction grating of suitable capability such as shown in FIG. 9.

The three output channels 206, 207 and 208 are applied to light modulators 211, 212 and 213, respectively. Modulators 211–213 control the intensity of light beams 214–216, respectively. A photochromic film 220, drawn at uniform speed past the beams 214–216, is thus exposed as to produce three variable density tracks 221–223.

Coherent light from source 225 is then directed through film 220. The film thus forms a dynamic diffraction grating. The interference pattern produced by the film 220 may be utilized as in FIG. 3.

In FIG. 9, film other than photochromic film may be employed. More particularly, photographic film may be employed but with suitable developing means, of conventional nature, interposed in the system, as at the location of arrow 230.

While reference has been made in the foregoing description to the use of collimated coherent light, it will be appreciated that such conditions would represent the most exact and, for some purposes, the preferred mode of carrying out the invention. However, the system will be operable if the light is not truly collimated but is to some degree divergent. To the extent that the light is not collimated, there would be introduced changes in scale factors which would be taken into account in determining frequency and direction. Furthermore, light from a white light source, suitably filtered, may be employed. In such case, the light would not be truly coherent but if quasi-coherent would be operable. In this description and in the appended claims the terms coherent and collimated are used in the less stringent sense.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for determining the angles φ between a reference direction and radial lines directed from a listening station toward radiating field sources of unknown locations which comprises,
   a. a dynamic diffraction grating means,
   b. means for directing collimated coherent light through said grating means,
   c. sensor means feeding sensor channels having different directional weighting characteristics terminating in separate transducers in said grating means for producing side-by-side physical representations of signals on said channels to produce interference patterns in light issuing from said grating means indicative of the relative locations of said field sources relative to the location of said sensor means.

2. The combination of claim 1 wherein means are provided for display of said light interference patterns.

3. The combination set forth in claim 2 wherein two dimensional display means includes structure for display of frequency of said sources as a function of the direction from said sensor means to said sources.

4. The combination set forth in claim 1 wherein indexing means are provided for altering the amplitude of the signal on one of said channels, relative to the other beams in accordance with a predetermined factor.

5. A system for determining the angle φ between a reference direction and a radial line extending from a listening station toward an radio frequency (R.F.) field source of unknown location which comprises,
   a. a light transmitting body having an index of refraction variable in dependence upon passage of an acoustic wave therethrough,
   b. means for directing collimated coherent light through said body,
   c. antenna means feeding R.F. sensor channels which terminate in acoustic transducers coupled to said body at laterally spaced locations for producing side-by-side acoustic beams in said body for travel therethrough along paths which are parallel to a plane which is perpendicular to light entering said body with
      i. a first of said beams is representative of a signal from an R.F. source of unknown location multiplied by a trigonometric function of the angle φ between a selected reference direction and the direction to said source, and
      ii. a second of said beams is representative of said signal from said source multiplied by a different trigonometric function of the angle φ, whereby an interference pattern is produced in light issuing from said body peculiarly related to the location of said source relative to said antenna means.

6. A system for determining the angle φ between a reference direction and a radial line directed from a listening station toward an radio frequency (R.F.) field source of unknown location which comprises,
   a. a light transmitting body having an index of refraction variable in dependence upon passage of an acoustic wave therethrough,
   b. means for directing collimated coherent light through said body,
   c. antenna means feeding R.F. sensor channels terminating in three acoustic transducers coupled to said body for producing three side-by-side acoustic beams in said body for travel therethrough along paths which are parallel to a plane which is perpendicular to light entering said body with i. the center beam representative of a signal from an R.F. source of unknown location multiplied by sin $\phi$ and cos $\phi$ where $\phi$ is the angle between a selected reference direction and the direction to said source,
  ii. a first side beam is representative of said signal, and
  iii. the second side beam is representative of said signal multiplied by sin $2\phi$ and cos $2\phi$, and
  d. means for displaying the light interference patterns emerging from said body.

7. The combination set forth in claim 6 wherein indexing means are provided for controlling the amplitudes of said center beam and said second beam are relative to the other in accordance with a predetermined ratio.

8. The combination set forth in claim 7 wherein said indexing means provides a ratio of about two to one.

9. In a system for identifying as to frequency and location a source of electromagnetic radiation which comprises,
  a. a light transmitting body having a variable index of refraction,
  b. means responsive to said radiation in an omni sense and in other senses which are directionally dependent in accordance with predetermined trigonometric functions to vary said index of refraction differently in different zones of said body, and
  c. means for directing a coherent light beam through said body to produce an interference pattern in coherent light issuing from said body uniquely indicative of the frequency of radiation from said unknown source and the angle between a reference direction and a line extending from said monitoring location to said source.

10. The system of claim 9 wherein said other senses are a sin $\phi$, cos $\phi$, sin $2\phi$, and cos $2\phi$ functions.

11. The method of determining the direction from a monitoring location to an unknown source of radiation which comprises,
  a. establishing side-by-side dynamic variations in the index of refraction of a transmitting light body in dependence upon an omni signal which includes said radiation and in dependence upon additional signals which include said radiation modified in accordance with directionally dependent trigonometric functions, and
  b. transmitting coherent light through said body for establishment of an interference pattern in coherent light issuing from said body uniquely indicative of the location of said source.

12. According to claim 11 in which the interference pattern of light issuing from said body is displayed in two dimensions with one dimension being representative of the frequency of radiation from said source and the other dimension being indicative of the direction from said monitor location to said source.

13. In monitoring radio frequency (R.F.) sources of unknown direction to determine the angles $\phi$ between a reference direction and lines directed from a monitoring location toward different R.F. field sources, the method which comprises,
  a. generating a first signal representative of the electric componenet of said field,
  b. generating a second signal representative of the magnetic component of said field multiplied by sin $\phi$,
  c. generating a third signal representative of the magnetic component of said field multiplied by cos $\phi$,
  d. generating a fourth signal representative of the magnetic component of said field multiplied by sin $2\phi$,
  e. generating a fifth signal representative of the magnetic component of the said field multiplied by cos $2\phi$,
  f. generating a sixth signal representative of the sum of said second signal and said third signal with said third signal shifted through a phase angle of 90°,
  g. generating a seventh signal representative of the sum of said fourth signal and said fifth signal with said fifth signal shifted through a phase angle of 90°,
  h. transmitting a collimated beam of coherent light through a body having an index of refraction variable in response to passage of acoustic waves therethrough,
  i. transmitting three parallel beams of acoustic waves through said body with the first of said beams being representative of said first signal, the second of said beams being representative of said sixth signal and the third of said beams being representative of said seventh signal with the paths of said first and second beams being spaced apart a distance equal to half the distance between the paths of said first and third beams thereby to produce an interference pattern in light issuing from said body uniquely related to the locations of said sources relative to said monitoring location, and
  j. displaying the interference patterns in the coherent light passing from said body.

* * * * *